US 6,673,271 B2

United States Patent
Hodgkinson et al.

(10) Patent No.: US 6,673,271 B2
(45) Date of Patent: Jan. 6, 2004

(54) TEMPERATURE INDICATING PAINT

(75) Inventors: Elaine C Hodgkinson, Derby (GB); Hugh ML Watson, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/226,020

(22) Filed: Aug. 23, 2002

(65) Prior Publication Data

US 2003/0043881 A1 Mar. 6, 2003

(30) Foreign Application Priority Data

Sep. 4, 2001 (GB) .............................. 0121310

(51) Int. Cl.⁷ ..................... G01N 33/00; G01K 11/00
(52) U.S. Cl. .................... 252/408.1; 374/162; 252/962
(58) Field of Search ................. 374/162; 252/962, 252/408.1; 116/207, 216

(56) References Cited

U.S. PATENT DOCUMENTS

| 1,777,353 | A | * | 10/1930 | Davis ........................ 374/162 |
| 3,445,291 | A | * | 5/1969 | Stein ........................ 252/962 |
| 4,925,727 | A | * | 5/1990 | Brown et al. ............... 116/216 |
| 5,008,136 | A | * | 4/1991 | Chamberlain ............... 116/207 |
| 2003/0044986 | A1 | * | 3/2003 | Watson .................... 252/408.1 |
| 2003/0044987 | A1 | * | 3/2003 | Watson et al. ................ 436/2 |
| 2003/0049467 | A1 | * | 3/2003 | Watson et al. .............. 428/447 |
| 2003/0049847 | A1 | * | 3/2003 | Watson et al. ................ 436/2 |

FOREIGN PATENT DOCUMENTS

| GB | 1103059 P | 2/1968 |
| GB | 2204874 A | 11/1988 |

* cited by examiner

Primary Examiner—Christopher W. Fulton
Assistant Examiner—Mirellys Jagan
(74) Attorney, Agent, or Firm—W. Warren Taltavull; Manelli, Denison & Selter PLLC

(57) ABSTRACT

An irreversible temperature indicating paint comprises 25 wt % to 50 wt % cobalt silicate, 0 wt % to 20 wt % alumino silicate, 0.5 wt % to 5 wt % toluidine red, 25 wt % to 40 wt % acrylic resin and 10 wt % to 20 wt % silicone resin excluding solvent. The solvent comprises a mixture of 80% 1-methoxy-2-propanol and 20% dipropylene glycol monomethyl ether. The irreversible temperature indicating paint has at least five colour changes in the temperature range 1050° C. to 1350° C. A particular irreversible temperature indicating paint comprises 33.8 wt % cobalt silicate, 16.9 wt % alumino silicate, 2 wt % toluidine red, 30.8 wt % acrylic resin and 16.5 wt % silicone resin excluding solvent. The irreversible temperature indicating paint is used to determine the temperatures to which various parts of turbine blades, turbine vanes or other components are subjected in operation of the gas turbine engine.

9 Claims, No Drawings

TEMPERATURE INDICATING PAINT

The present invention relates to an irreversible temperature indicating paint.

Irreversible temperature indicating paint changes colour at one or more known temperatures. These colour changes of the temperature indicating paint indicate the temperature to which different parts of a component or components have been subjected. The final colour of the irreversible temperature indicating paint is dependent on both the temperature it is subjected to and the time period over which it is held at a raised temperature. The irreversible temperature indicating paint is applied to a component in a test situation and subsequently analysed to determine the temperatures to which different regions of the component reached during the test. Irreversible temperature indicating paint thus produce a temperature profile over the whole surface of a component rather than discrete points, if for example thermocouples are used.

Irreversible temperature indicating paints are applied to components, for example turbine blades, turbine vanes and combustors, of gas turbine engines and the gas turbine engine is run at the gas turbine engines normal operating conditions.

One known temperature indicating paint described in our UK patent GB1103059 comprises principally lead chromate, magnesium carbonate and silica.

Another known temperature indicating paint described in our UK patent GB2204874 comprises one or more of silver, gold, platinum, palladium, copper, nickel, chromium, titanium and silicon dispersed in 10 to 70 wt % solvent and resin.

Currently used temperature indicating paint do not provide colour changes at sufficiently high temperatures.

Accordingly the present invention seeks to provide a novel irreversible temperature indicating paint which has a plurality of colour changes in the temperature range 1050° C. to 1350° C. to provide colour changes at higher temperatures.

Accordingly the present invention provides an irreversible temperature indicating paint comprising cobalt silicate, alumino silicate, toluidine red, binder and a solvent.

Preferably the binder comprises acrylic resin and silicone resin.

Preferably the irreversible temperature indicating paint comprises 25 wt % to 50 wt % cobalt silicate, 0 wt % to 25 wt % alumino silicate, 0.5 wt % to 5 wt % toluidine red, 25 wt % to 40 wt % acrylic resin and 10 wt % to 20 wt % silicone resin excluding solvent.

Preferably the irreversible temperature indicating paint comprises 30 wt % to 50 wt % cobalt silicate, 0 wt % to 20 wt % alumino silicate, 0.5 wt % to 4 wt % toluidine red, 30 wt % to 35 wt % acrylic resin and 15 wt % to 20 wt % silicone resin excluding solvent.

More preferably the irreversible temperature indicating paint comprises 32.5 wt % to 45 wt % cobalt silicate, 5 wt % to 17.5 wt % alumino silicate, 0.5 wt % to 3 wt % toluidine red, 30 wt % to 32.5 wt % acrylic resin and 15 wt % to 17.5 wt % silicone resin excluding solvent.

The irreversible temperature indicating paint may comprise 33.8 wt % cobalt silicate, 16.9 wt % alumino silicate, 2.0 wt % toluidine red, 30.8 wt % acrylic resin and 16.5 wt % silicone resin excluding solvent.

The irreversible temperature indicating paint may comprise 44.7 wt % cobalt silicate, 6.4 wt % alumino silicate, 0.7 wt % toluidine red, 32.2 wt % acrylic resin and 16.0 wt % silicone resin excluding solvent.

Preferably the solvent comprises a mixture of propylene glycol ethers. Preferably the solvent comprises a mixture of 80% 1-methoxy-2-propanol and 20% dipropylene glycol monomethyl ether.

The present invention will be more fully described by way of example.

An irreversible temperature indicating paint according to the present invention has five or more colour changes in the temperature range 1050° C. to 1350° C. when run at maximum operating conditions of a gas turbine engine, or other engine, for 3 minutes.

The irreversible temperature indicating paint comprises cobalt silicate, alumino silicate, toluidine red a binder and a solvent. The binder preferably comprises acrylic resin and silicone resin.

The irreversible temperature indicating paint broadly comprises 20 wt % to 35 wt % cobalt silicate, 0 wt % to 20 wt % alumino silicate, 0.5 wt % to 3 wt % toluidine red, 20 wt % to 25 wt % acrylic resin and 10 wt % to 15 wt % silicone resin excluding solvent.

The solvent preferably comprises a mixture of propylene glycol ethers. Preferably the solvent comprises a mixture of 80% 1-methoxy-2-propanol and 20% dipropylene glycol monomethyl ether. The amount of solvent used depends upon the particular method of applying the paint.

A particular irreversible temperature indicating paint comprises 33.8 wt % cobalt silicate ($Co_2SiO_4$), 16.9 wt % alumino silicate ($Al_2O_3.2SiO_2$), 2.0 wt % toluidine red, 30.8 wt % acrylic resin and 16.5 wt % silicone resin excluding solvent.

If this paint is run for 3 minutes at maximum operating temperature of the gas turbine engine there are six colour changes. The paint is light pink in colour below 1100° C., changes to light blue at 1100° C., changes to blue at 1180° C., changes to midnight blue at 1230° C., changes to matt black at 1250° C., changes to matt black glaze at 1270° C. and changes to dark blue glaze at 1290° C.

A further irreversible temperature indicating paint comprises 44.7 wt % cobalt silicate ($Co_2SiO_4$), 6.4 wt % alumino silicate ($Al_2O_3.2SiO_2$), 0.7 wt % toluidine red, 32.2 wt % acrylic resin and 16.0 wt % silicone resin excluding solvent.

If this paint is run for 3 minutes at maximum operating temperature of the gas turbine engine the are six colour changes. The paint is pink in colour below 1180° C., changes to light blue at 1180° C., changes to blue at 1230° C., changes to midnight dark mauve at 1270° C., changes to matt black at 1310° C., changes to matt black glaze at 1320° C. and changes to full black glaze at 1330° C.

The irreversible temperature indicating paint is applied to turbine blades or turbine vanes or other components of gas turbine engines. The irreversible temperature indicating paint is used to determine the temperatures to which various parts of the turbine blade, turbine vane or other component are subjected in operation of the gas turbine engine.

The irreversible temperature indicating paint may be used on components in other engines or other machines or other apparatus to determine the temperature to which various parts of the component are subjected in operation.

The advantage of the irreversible temperature indicating paint of the present invention is that it has temperature indicating colour change points at higher temperatures. This allows higher temperatures to be indicated.

We claim:

1. An irreversible temperature indicating paint comprising cobalt silicate, alumino silicate, toluidine red, binder and a solvent.

2. An irreversible temperature indicating paint as claimed in claim 1 wherein the binder comprises acrylic resin and silicone resin.

3. An irreversible temperature indicating paint as claimed in claim 2 comprising 25 wt % to 50 wt % cobalt silicate, 0 wt % to 25 wt % alumino silicate, 0.5 wt % to 5 wt % toluidine red, 25 wt % to 40 wt % acrylic resin and 10 wt % to 20 wt % silicone resin excluding solvent.

4. An irreversible temperature indicating paint as claimed in claim 3 comprising 30 wt % to 50 wt % cobalt silicate, 0 wt % to 20 wt % alumino silicate, 0.5 wt % to 4 wt % toluidine red, 30 wt % to 35 wt % acrylic resin and 15 wt % to 20 wt % silicone resin excluding solvent.

5. An irreversible temperature indicating paint as claimed in claim 4 comprising 32.5 wt % to 45 wt % cobalt silicate, 5 wt % to 17.5 wt % alumino silicate, 0.5 wt % to 3 wt % toluidine red, 30 wt % to 32.5 wt % acrylic resin and 15 wt % to 17.5 wt % silicone resin excluding solvent.

6. An irreversible temperature indicating paint as claimed in claim 2 comprising 33.8 wt % cobalt silicate, 16.9 wt % alumino silicate, 2.0 wt % toluidine red, 30.8 wt % acrylic resin and 16.5 wt % silicone resin excluding solvent.

7. An irreversible temperature indicating paint as claimed in claim 2 comprising 44.7 wt % cobalt silicate, 6.4 wt % alumino silicate, 0.7 wt % toluidine red, 32.2 wt % acrylic resin and 16.0 wt % silicone resin excluding solvent.

8. An irreversible temperature indicating paint as claimed in claim 1 wherein the solvent comprises a mixture of propylene glycol ethers.

9. An irreversible temperature indicating paint as claimed in claim 8 wherein the solvent comprises a mixture of 80% 1-methoxy-2-propanol and 20% dipropylene glycol monomethyl ether.

* * * * *